(12) United States Patent
Callies et al.

(10) Patent No.: US 9,904,439 B2
(45) Date of Patent: *Feb. 27, 2018

(54) MANAGING ITEMS IN A NETWORKED ENVIRONMENT

(71) Applicant: Amazon Technologies, Inc., Reno, NV (US)

(72) Inventors: Daniel J. Callies, Seattle, WA (US); Stephenie Landry, Seattle, WA (US); Russell C. Grandinetti, Seattle, WA (US); Aaron M. Donsbach, Seattle, WA (US); Julie Todaro, Seattle, WA (US); Devraj Varadhan, Bellevue, WA (US); Smita Joshi, Issaquah, WA (US); Ganesh Rao, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 355 days.

This patent is subject to a terminal disclaimer.

(21) Appl. No.: 13/801,442

(22) Filed: Mar. 13, 2013

(65) Prior Publication Data
US 2013/0198650 A1   Aug. 1, 2013

Related U.S. Application Data

(63) Continuation of application No. 12/826,421, filed on Jun. 29, 2010, now Pat. No. 8,429,539.

(51) Int. Cl.
*G06F 3/0484* (2013.01)
*G06Q 30/02* (2012.01)
*G06Q 30/06* (2012.01)

(52) U.S. Cl.
CPC ........... *G06F 3/0484* (2013.01); *G06Q 30/02* (2013.01); *G06Q 30/0601* (2013.01)

(58) Field of Classification Search
CPC .............. G06Q 30/02; G06Q 30/0601; G06Q 30/0629; G06F 3/0484
USPC ......................................................... 715/745
See application file for complete search history.

(56) References Cited

U.S. PATENT DOCUMENTS

| | | | |
|---|---|---|---|
| 5,592,378 A | 1/1997 | Cameron et al. |
| 5,749,081 A | 5/1998 | Whiteis |
| 6,064,980 A | 5/2000 | Jacobi et al. |
| 6,115,717 A | 9/2000 | Mehrotra et al. |

(Continued)

FOREIGN PATENT DOCUMENTS

WO    WO 0103047 A1 *  1/2001  ............. G06Q 30/06

OTHER PUBLICATIONS

Website for Gap Inc.—http/www.gap.com—Retrieved Dec. 19, 2010.
Jul. 2006—https://web.archive.org/web/20060712105423/http://docs.smallbusiness.miva.com/en-US/merchant/4/webhelp/create_attribute_templates.htm.

*Primary Examiner* — Jennifer To
*Assistant Examiner* — John Repsher, III
(74) *Attorney, Agent, or Firm* — Knobbe, Martens, Olson & Bear LLP

(57) ABSTRACT

A system, methods and interfaces are provided for managing items in a networked environment. A set of items, such as publications or other works, can be embodied in tangible media that are mutually exclusive. In response to a selection of an item, a prioritized order of the tangible media corresponding to the selected item is provided. Each tangible media can be further subdivided into a prioritized order of physical attributes of the respective tangible media.

22 Claims, 6 Drawing Sheets

(56) References Cited

U.S. PATENT DOCUMENTS

| | | |
|---|---|---|
| 6,185,558 B1 | 2/2001 | Bowman et al. |
| 6,266,649 B1 | 7/2001 | Linden et al. |
| 6,317,722 B1 | 11/2001 | Jacobi et al. |
| 6,366,910 B1 | 4/2002 | Rajaraman et al. |
| 6,615,226 B1 | 9/2003 | Hartman et al. |
| 6,731,309 B1 | 5/2004 | Unbedacht et al. |
| 6,785,671 B1 | 8/2004 | Bailey et al. |
| 6,853,982 B2 | 2/2005 | Smith et al. |
| 6,912,505 B2 | 6/2005 | Linden et al. |
| 6,963,848 B1 | 11/2005 | Brinkerhoff |
| 7,016,865 B1 | 3/2006 | Weber et al. |
| 7,050,992 B1 | 5/2006 | Bowman et al. |
| 7,113,917 B2 | 9/2006 | Jacobi et al. |
| 7,127,414 B1 * | 10/2006 | Awadallah et al. .......... 705/26.8 |
| 7,181,419 B1 | 2/2007 | Mesaros |
| 7,203,675 B1 | 4/2007 | Papierniak et al. |
| 7,266,514 B2 | 9/2007 | Herbert et al. |
| 7,305,355 B2 | 12/2007 | Tarvydas et al. |
| 7,331,038 B1 | 2/2008 | Snodgrass et al. |
| 7,460,735 B1 | 12/2008 | Rowley et al. |
| 7,856,380 B1 | 12/2010 | Latin-Stoermer et al. |
| 7,945,484 B1 | 5/2011 | Tam et al. |
| 7,961,938 B1 | 6/2011 | Remedios |
| 8,429,539 B1 | 4/2013 | Callies et al. |
| 8,700,490 B1 | 4/2014 | Bhaktwatsalam et al. |
| 2001/0047348 A1 * | 11/2001 | Davis ................. 707/1 |
| 2002/0010639 A1 | 1/2002 | Howey et al. |
| 2002/0120935 A1 * | 8/2002 | Huber et al. ................ 725/60 |
| 2003/0014331 A1 * | 1/2003 | Simons ................. G06Q 30/02 705/26.62 |
| 2004/0143600 A1 | 7/2004 | Musgrove et al. |
| 2004/0193591 A1 | 9/2004 | Winter |
| 2005/0071242 A1 | 3/2005 | Allen et al. |
| 2005/0251410 A1 * | 11/2005 | Kahn ................. 705/1 |
| 2006/0031123 A1 | 2/2006 | Leggett et al. |
| 2006/0059062 A1 * | 3/2006 | Wood et al. ................ 705/35 |
| 2006/0293970 A1 | 12/2006 | Haynes et al. |
| 2007/0061328 A1 * | 3/2007 | Ramer et al. .................. 707/10 |
| 2007/0073592 A1 | 3/2007 | Perry et al. |
| 2007/0168391 A1 | 7/2007 | Coschigano et al. |
| 2007/0168517 A1 | 7/2007 | Weller |
| 2007/0192438 A1 * | 8/2007 | Goei ................. 709/219 |
| 2008/0154747 A1 | 6/2008 | Tarbell et al. |
| 2008/0177639 A1 | 7/2008 | Kuppersmith et al. |
| 2009/0007012 A1 | 1/2009 | Mandic et al. |
| 2009/0164338 A1 * | 6/2009 | Rothman ................. 705/27 |
| 2010/0235394 A1 * | 9/2010 | Sukanen et al. ............. 707/782 |

\* cited by examiner

MANAGING ITEMS IN A NETWORKED ENVIRONMENT

CROSS-REFERENCE TO RELATED APPLICATION

This application is a continuation of U.S. patent application Ser. No. 12/826,421, entitled MANAGING ITEMS IN A NETWORKED ENVIRONMENT, and filed Jun. 29, 2010, the entirety of which is incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

With reference to an illustrative embodiment, a content provider can provide a network resource, such as a Web page, that can correspond to one or more items available for a user to select, view or indicate a desire to purchase. For example, a content provider can provide a Web page associated with the display and sale of shoes. In this illustrative embodiment, the items corresponding to the Web page (e.g., shoes for sale) can be associated with various attributes, such as foot size, color, manufacturer, style, etc. Accordingly, to allow users to locate one or more specific items, the content provider's Web page can allow users to designate one or more attributes of interest. The designated attributes can then be used as filtering criteria for a greater subset of items, such as a catalog of all shoes available for selection, viewing or purchasing via the Web page. Specifically, the content provider can narrow the subset of items that are presented to a user via the Web page based on matches/exclusions to the filtering criteria. As the process is repeated with additional filtering criteria (e.g., the specification of values for more physical attributes), users may be able to iteratively focus the items available for selection. This type of interaction can be referred to generally as a multi-dimensional selection environment, in which each specified attribute/search criteria corresponds to a "dimension."

In the above illustrative example of a multi-dimensional selection environment, the subset of items presented to the user have a degree of overlap with regard to multiple physical attributes (e.g., all the shoes have the physical attributes of a size and a color). In one aspect, because of the overlapping physical attributes, the physical attributes are readily known to the users. Thus, the typical user would be able to enter specific physical attribute values (e.g., color) to identify items of interest. In another aspect, the order of the specified physical attribute data is not as relevant in terms of yielding search results. With continued reference to the shoe example, a specification of shoe color first, followed by size will likely yield the same results (or at least similar results) as a specification of size followed by shoe color. However, the traditional multi-dimensional selection environment approach can become deficient for groups of items in which the attributes are not overlapping or have limited overlap.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

Figure 1:
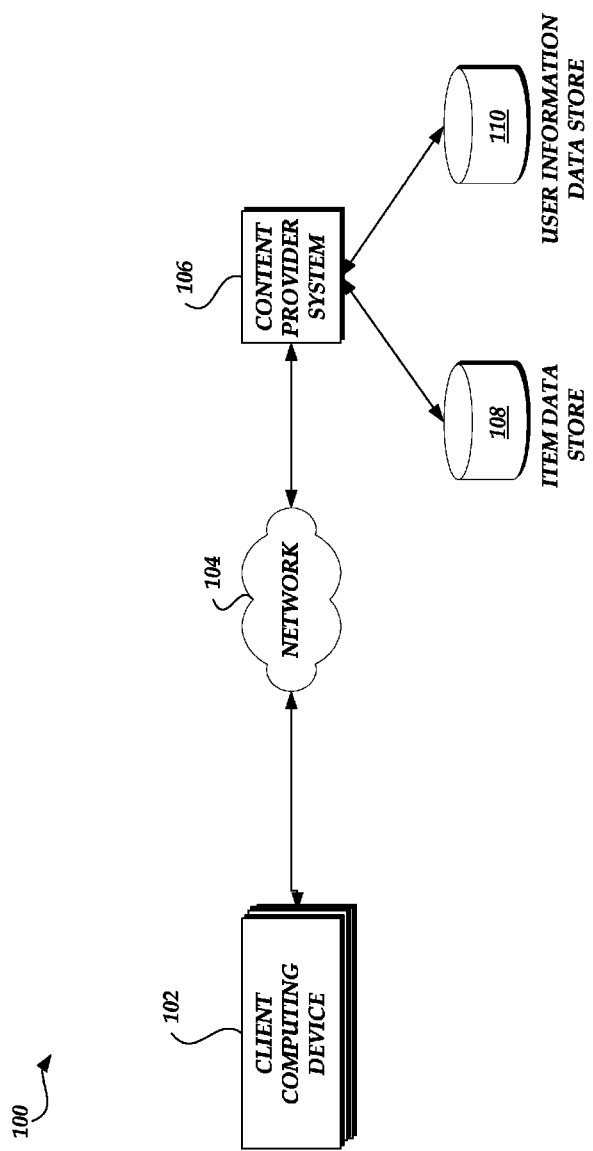
FIG. 1 is a block diagram of an illustrative networked environment including a client computing device and a content provider system.

Generally described, the present disclosure is directed to the management of items in a networked environment. Specifically, aspects of the present disclosure will be described with regard to the management of items in which one or more items can be embodied in different instance types. In an illustrative embodiment, the items can correspond to works, or publications, such that each instance type corresponds to a tangible medium embodying the work. Still further, for each item, each tangible medium is mutually exclusive from other tangible media and can be further subdivided by into one or more physical attributes corresponding to the respective tangible medium. One skilled in relevant art will appreciate that item, or items, may refer to any number of physical goods or services that can be provided, or otherwise rendered, on behalf of a requestor.

In accordance with an illustrative embodiment, based on a selection of item, such as via a network resource (e.g., a Web page), a content provider system can determine two or more instance types that correspond to the selected item. The instance types are illustratively mutually exclusively. Responsive to the selection, the content provider can determine a prioritized order for the two or more instance types and provide the prioritize order for display to the requesting user. Illustratively, the generated display can include selectable representations of the prioritized order of instance types. Based on the selection of a specific representation of an instance type, the content provider system can further determine one or more attributes corresponding to the instance type and prioritize the one or more attributes. Accordingly, responsive to the selection of a specific representation of an instance type, the content provider system can provide the prioritized order of attributes for display to the requesting user.

As described above, the set of items managed by the content provider system correspond to works, or publications. Accordingly, in an illustrative embodiment, the representation of the two or more instance types corresponds to the representation of two or more tangible media instance types for a selected work. Examples of such tangible media include, but are not limited to, printed media (e.g., hardback, paperback), audio media (e.g., CDs, DVDs, a downloadable audio file for generating audio signals), and electronic media (e.g., a media file for display on an electronic reader book, or an image or video file for rendering on a display) and the like. With continued reference to this specific embodiment, each definition of a tangible medium instance type can be further subdivided into one or more physical attributes unique to the tangible medium. For example, an audio media instance type may be subdivided into a digital audio file embodied in an optical storage media (e.g., a CD or DVD)

or a digital audio file embodied in a semiconductor based storage media (e.g., an encoded file transmitted and stored in a memory component).

Although aspects of the present disclosure will be described with regard to works, or publications, one skilled in the art will appreciate that the present disclosure is not to be limited solely to application with works or printed publications. Additionally, the disclosed environment, methods, processes and interfaces are illustrative in nature and should not be construed as limiting.

With reference to FIG. 1, an illustrative networked environment 100 for the management of items will be described. The networked environment 100 includes a number of client computing devices 102 for generating requests/selecting items managed by a content provider. The client computer devices 102 can correspond to a wide variety of devices or components that are capable of initiating, receiving or facilitating communications over a communication network 104 including, but not limited to, personal computing devices, electronic book readers (e.g., e-book readers), hand held computing devices, integrated components for inclusion in computing devices, home electronics, appliances, vehicles, machinery, smart phones, modems, personal digital assistants, laptop computers, gaming devices, media devices, and the like. Additionally, illustratively, the client computing devices 102 can render information one or more displays.

In an illustrative embodiment, the client computing devices 102 may include one or more processing units, such as one or more CPUs. The client computing devices 102 may also include system memory, which may correspond to any combination of volatile and/or non-volatile storage mechanisms. The system memory may store information which provides an operating system component, various program components, program data and other components. The above-enumerated list of components is representative and is not exhaustive of the types of functions performed, or components implemented, by the client computing devices 102. The client computing devices 102 performs functions by using the processing unit(s) to execute instructions provided by the system memory. The client computing devices 102 may also include one or more input devices (keyboard, mouse device, specialized selection keys, etc.) and one or more output devices (displays, printers, audio output mechanisms, etc.). Additionally, the client computing devices 102 may also be in communication (via a wired or wireless connection) with one or more external out devices, such as external monitors, speakers, etc.

In an illustrative embodiment, the client computing devices 102 include necessary hardware and software components for establishing communications over a communication network 104, such as a wide area network (e.g., the Internet) or a local area network. For example, the client computing devices 102 may be equipped with networking equipment and browser software applications that facilitate communications via the Internet or an intranet.

With continued reference to FIG. 1, the networked environment includes a content provider system 106 for managing items via the communication network 104. The content provider system 106 can correspond to a number of computing devices for interfacing with client computing devices 102 to provide information utilized to generate displays of prioritized instance types on the client computing devices. Illustrative components of the content provider system 106 will be described with regard to FIG. 2. In communication with the content provider system 106 is an item data store 108 for maintaining information about items managed by the content provider system 106. Also in communication with the content provider system 106 is a user information data store 110 for maintaining information about users of the networked environment 100. The item data store 108 and user information data store 110 may correspond to a number of computing devices having memory for maintaining information. Although illustrated as in direct communication with the content provider system 106, the item data store 108 and user information data store 110 may be remote from the content provider system 106. Additionally, the item data store 108 and user information data store 110 may distributed across various computing devices via a communication network.

In an alternative embodiment, the content provider system 106 may also be configured as a network-based service, such as a Web service. In this embodiment, one or more computing systems, such as a client computing device 102, would request prioritized lists of instance types or prioritized lists of attributes for a specified instance type from the content provider system 106. For example, the client computing device 102 could request the prioritized list of instance types or prioritized lists of attributes for an instance type via an application programming interface ("API"). In turn, the content provider system 106 would return the requested information in accordance with the API.

Figure 2:
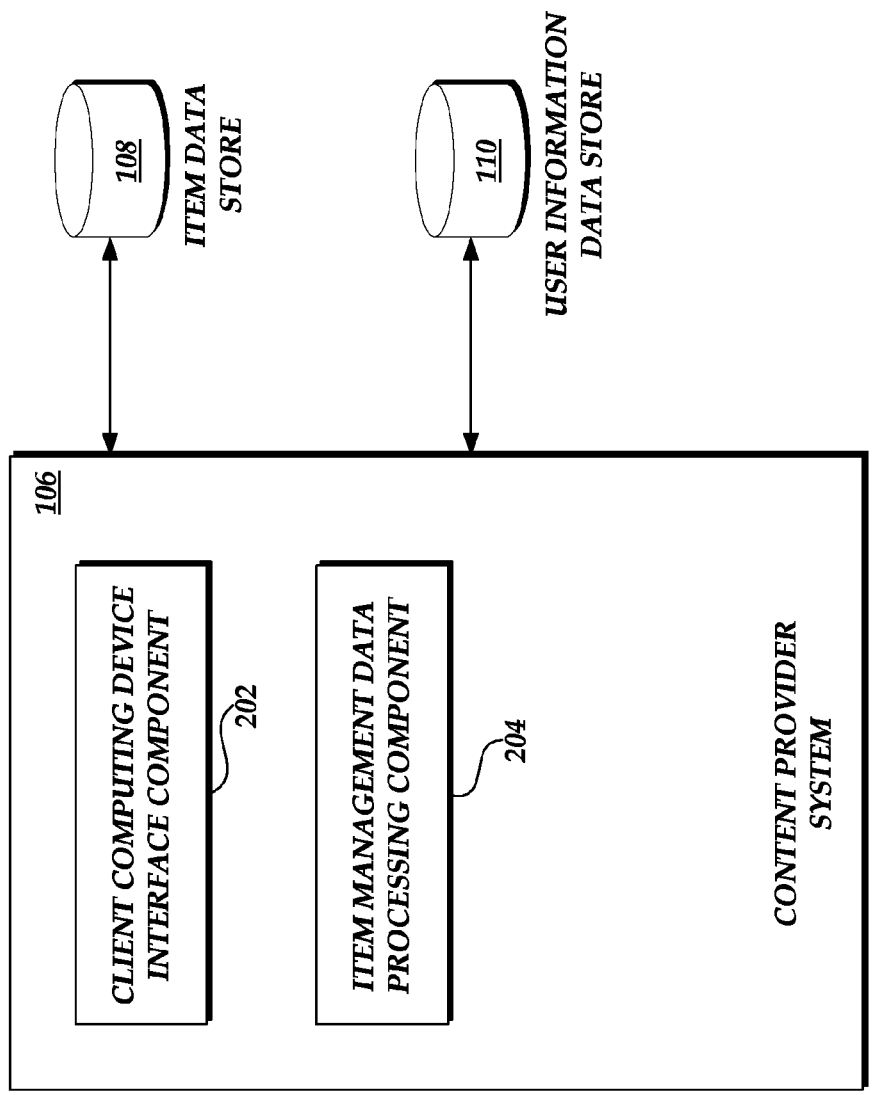
FIG. 2 is a block diagram illustrative of components of a content provider system for managing items.

Turning now to FIG. 2, an illustrative block diagram of the functions provided by the content provider system 106 will be described. The content provider system 106 can include an interface component 202 for interfacing with client computing devices 102. Illustratively, the interface component 202 can obtain user selections of items, such as via a Web page. Additionally, the interface component 202 can transmit data, or otherwise cause data to be transmitted, responsive to user selections that include prioritized lists of instance data or prioritized lists of physical attributes corresponding to a selected item and a selected instance type, respectively. The content provider system 106 can also include an item management processing component 204 for determining the prioritized lists of instance data for a selected item. The item management processing component 204 may utilize information corresponding to a manual configuration of instance types for items. Alternatively, the item management processing component 204 can dynamically process item information to determine a set of potential instance types. The item management processing component 204 can further determine the prioritized lists of physical attributes for a selected instance type. Still further, the item management processing component 204 can filter, or otherwise process, the prioritized list according to user information, such as user geographic information or user purchase history information. As previously described, the content provider system 106 is in communication with the item data store 108 and user information data store 110.

Similar to client computing devices 102, the components of the content provider system 106 may include one or more processing units, such as one or more CPUs. The components of the content provider system 106 may also include system memory, which may correspond to any combination of volatile and/or non-volatile storage mechanisms. The system memory may store information which provides an operating system component, various program components, program data and other components. The above-enumerated list of components is representative and is not exhaustive of the types of functions performed, or components implemented, by the content provider system 106. The content provider system 106 performs functions by using the processing unit(s) to execute instructions provided by the system memory. The content provider system 106 may also include one or more input devices (keyboard, mouse device, specialized selection keys, etc.) and one or more output devices (displays, printers, audio output mechanisms, etc.). Additionally, the content provider system 106 may also be in communication (via a wired or wireless connection) with one or more external out devices, such as external monitors, speakers, etc. However, one skilled in the relevant art will appreciate that at least some of the components of the content provider system 106 may be specialized for specific roles such that at least a portion of the above enumerated software or hardware description may be omitted. For example, at least one computing device associated with the content provider system 106 may be a dedicated server computing device not requiring a display output device.

In accordance with the present disclosure, items, such as works or publications, may be embodied in a variety of instance types that may be mutually exclusive. Specifically, a specific embodiment of the instance type is mutually exclusive from another embodiment of the instance type. With reference to works, each instance type can correspond to a media embodying the specific work. For example, reference to a printed publication could correspond to the rendering of a literary work on paper media (e.g., a hardback book). Likewise, reference to an audio media could correspond to the rendering/storage of a musical work on an optical media or semiconductor media. Each specific instance type may be further broken down into one or more attributes that are descriptive of variations of the instance types. Illustratively, each identified attribute can correspond to the specific item that can be requested, ordered or purchased by the user. With continued reference to works, the attributes can correspond to physical attributes of the specific media, which likely varies from media type to media type. For example, a printed publication instance type may be associated with different binding types as attributes. The items may be further characterized by any number of hierarchical levels corresponding to attributes or groups of attributes.

Figure 3:
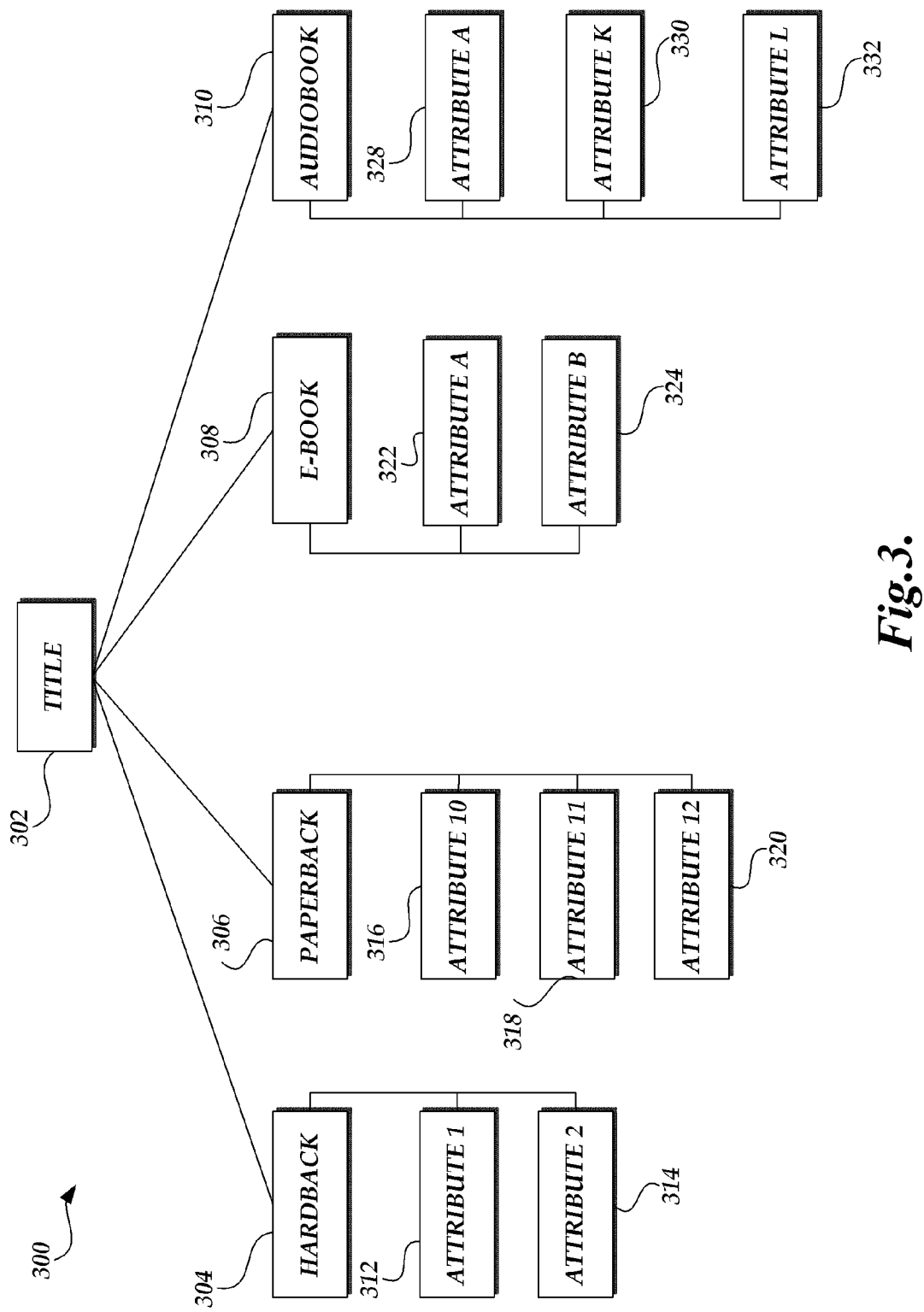
FIG. 3 is a block diagram of a hierarchy of instance and attribute data for a selected item.

With reference now to FIG. 3, a block diagram illustrative of a hierarchy of instance types 300 and attributes for a work will be described. The hierarchy of instance types 300 includes a base node 302 corresponding to a highest level of the hierarchy of instance types 300. As illustrated in FIG. 3, the base node 302 corresponds to a title of the work, "Title of Book," which is representative of the item selected by a user via a client computing device 102. The hierarchy of instance types 300 then includes a plurality of nodes corresponding to the available embodiments of the item. Specifically, the hierarchy of instance types 300 includes a node 304 corresponding to a hardback binding type, a node 306 corresponding to a paperback binding type, a node 308 corresponding to an electronic book representation (e.g., a digital file for rendering by an electronic book reader), and a node 310 corresponding to an audio book representation (e.g., an audio file embodied in some tangible media). The instance types for each item may vary according to the number of identifiable mutually exclusive types of a given item. Furthermore, the definition of mutually exclusive instance types may be customized by a content provider. For example, a content provider may consider a digital audio representation to be a different mutually exclusive instance type from an analog representation.

With continued reference to FIG. 3, each instance type 304-310 can be further subdivided into one or more attributes, such as physical attributes. Each attribute is associated with the specific instance type and may vary from item to item. As illustrated in FIG. 3, node 304 (e.g. "hardback") corresponds to two attribute nodes 312 ("Attribute 1") and 314 ("Attribute 2"). By way of example, node 312 can correspond to a large print edition and node 314 can correspond to an illustrated edition. Node 306 (e.g., "paperback") corresponds to three attributes, nodes 316 ("Attribute 10"), 318 ("Attribute 11") and 320 ("Attribute 12"). By way of example, node 316 and node 318 can correspond to various paper weights of the paperback editions. Node 308 (e.g., "e-book") can correspond to two attribute nodes 322 ("Attribute A") and 324 ("Attribute B"). By way of example, node 322 can correspond to an abridged version and node 324 can correspond to content having digital rights management encoding. Finally, node 310 (e.g., "Audio") can correspond to three attribute nodes 328 ("Attribute A"), 330 ("Attribute K") and 332 ("Attribute L"). By way of example, node 328 can correspond to an abridged version while nodes 330 and 332 correspond to different storage media, such as CD-ROM, audio cassette, audio download, and the like. As illustrated in FIG. 3, it may be possible for instance types to have some attributes in common, such as node 322 and 328. One skilled in the relevant art will appreciate that the above hierarchy of instance types 300 is illustrative in nature with regard to the specific number and identification of instance types and attributes. Accordingly, the specific examples illustrated in FIG. 3 should not be construed as limiting.

Figure 4:
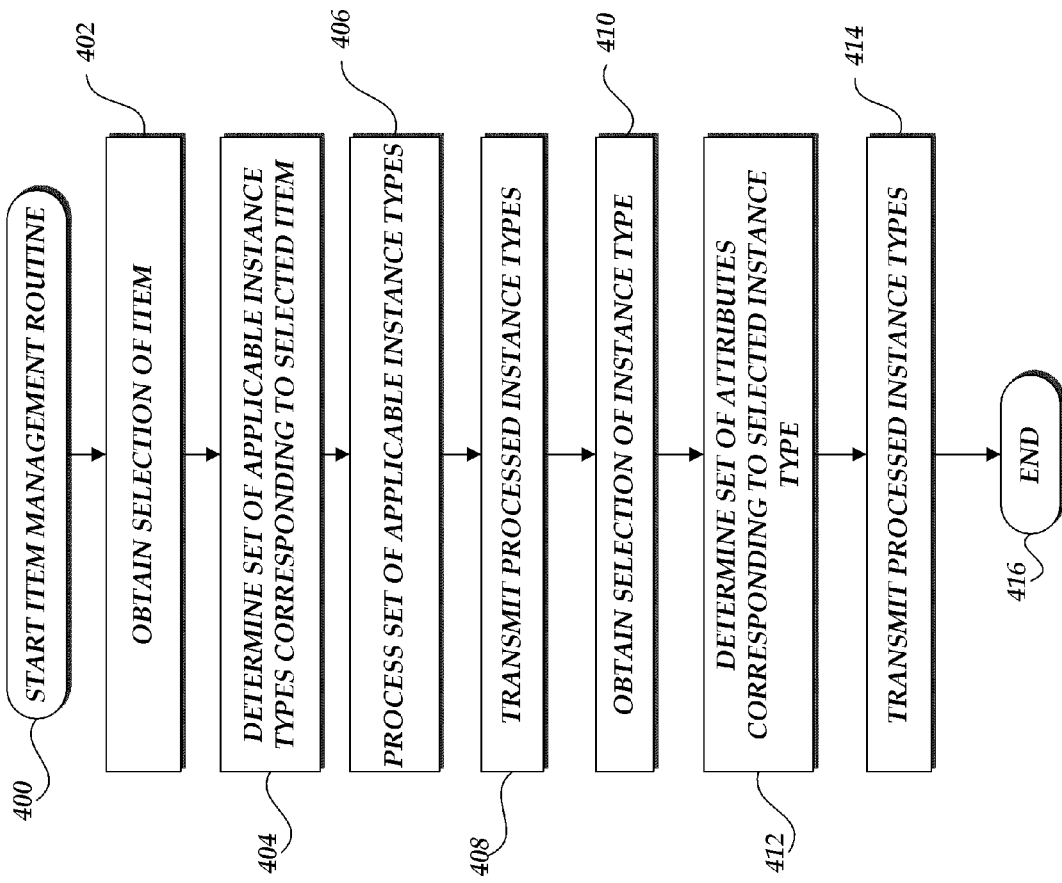
FIG. 4 is a flow diagram illustrative a content management routine implemented by a content provider system.

Turning now to FIG. 4, a flow diagram illustrative of a content management routine 400 implemented by the content provider system 106 (FIG. 1) for managing items will be described. At block 402, the content provider system 106 obtains a selection of an item. Illustratively, the selection of the item may be facilitated through the interaction of the client computing device 102 with a network resource, such as a Web page. The selection may correspond to an indication of a desire to purchase an item, to request more information about a selected item. to provide information about an item (e.g., rate an item), to select an item to/from a wishlist, and the like. In an alternative embodiment, the selection of the item may be obtained via information included in an API. At block 404, the content provider system 106 determines a set of applicable instance types corresponding to the selected item. In illustrative embodiment, the item data store 108 may include information identifying instance types for an item. In one embodiment, the instance type information may be manually configured by a system administrator that determines each specific instance type. Alternatively, the content provider system 106 may dynamically determine the instance type information. For example, the content provider system 106 may dynamically conduct a statistical analysis of description information regarding tangible media to determine whether there are statistically significant differences in the description. Each statistically significant different may be determined to be a possible candidate for an instance type. In another embodiment, the content provider system 106 may utilize historical information, such as purchase or browsing information, to identify different instance types (e.g., customers typically purchase either a hardback book or a paperback book). As applied to a selected item corresponding to a work, the instance types would correspond to mutually exclusive tangible media embodying the selected work.

At block 406, the content provider system 106 processes the set of potential instance types. In one aspect, the content provider system 106 determines a prioritized list of instance data that will determine an order in which the instance types will be provided to a user. In one embodiment, the prioritization criteria can correspond to a seller of the instance type in which the content provider system 106 gives different priorities to sellers or types of sellers (e.g., partners). In another embodiment, the prioritization criteria can correspond to shipping information regarding each tangible medium. In a further embodiment, the prioritization criteria can correspond to an order dictated, at least in part, on customer reviews. In still another embodiment, the prioritization criteria can correspond to an order dictate, at least in part, on a profit to be made by the content provider. In still a further embodiment, the prioritization criteria can correspond to a classification of instance type, such as "new" or "used." In another embodiment, the prioritization criteria can correspond to a selling price. In a further embodiment, the prioritization criteria can correspond to amounts paid by sellers or service level agreements associated with sellers. Other prioritization criteria may be applied.

With continued reference to block 406, in another aspect, the content provider system 106 can also filter the prioritized list of instance data according to user information. Illustratively, the filtering can correspond to a context-based processing of the ordered list of instance data. Illustratively, the content provider system 106 can utilize user profile information maintained in the user information data store 110 (FIG. 1). In one embodiment, the content provider system 106 can utilize geographic information for filtering instance data in which the content provider cannot provide the instance type. For example, a content provider may not have a license to distribute an electronic version to some specific countries. In another embodiment, the content provider system 106 can utilize user purchase history to filter or re-prioritize the prioritize list of instance data based on purchase histories. For example, the content provider system 106 can delete or reprioritize the hardback work instance types given the user's tendency to always purchase paperback work instance types. At block 408, the content provider system 106 transmits the processed list of instance data for display by the client computing device. An illustrative user interface incorporating the processed list of instance data will be described with regard to FIG. 5A. Alternatively, the processed list of instance types may be transmitted for processing, such as via an API.

Thereafter, at block 410, the content provider system 106 obtains a selection of a specific instance type, such as by a user selection of a representation of an instance type on a user interface. As described above, illustratively, the selection of the representation of the instance type may be facilitated through the interaction of the client computing device 102 with a network resource, such as a Web page. Alternatively, the specification of the instance type can be facilitated through an API. At block 412, the content provider system 106 determines a prioritized set of attributes for the selected instance type. In a manner similarly discussed above, the content provider system 106 can utilize various prioritization criteria for determining the prioritization of attributes. In n one embodiment, the prioritization criteria can correspond to a seller of the instance type in which the content provider system 106 gives different priorities to sellers or types of sellers. In another embodiment, the prioritization criteria can correspond to shipping information regarding each tangible medium. In a further embodiment, the prioritization criteria can correspond to an order dictated, at least in part, on customer reviews. In still another embodiment, the prioritization criteria can correspond to an order dictated, at least in part, on a profit to be made by the content provider. In still a further embodiment, the prioritization criteria can correspond to a release data corresponding to a public release of the work. In still a further embodiment, the prioritization criteria can correspond to a classification of attribute type, such as grades of use. In another embodiment, the prioritization criteria can correspond to a selling price. In a further embodiment, the prioritization criteria can correspond to amounts paid by sellers or service level agreements associated with sellers. Other prioritization criteria may be applied.

At block 414, the content provider system 106 transmits the processed list of attribute data for display by the client computing device. An illustrative user interface incorporating the processed list of attribute data for a selected instance type will be described with regard to FIG. 5B. The routine 400 can continue at block 414 based on a user interaction with the display of instance types and the display of various attributes for each selected instance type. Alternatively, the processed list of attribute date may be transmitted for processing, such as via an API. At block 416, the routine 400 terminates.

Figure 5A:
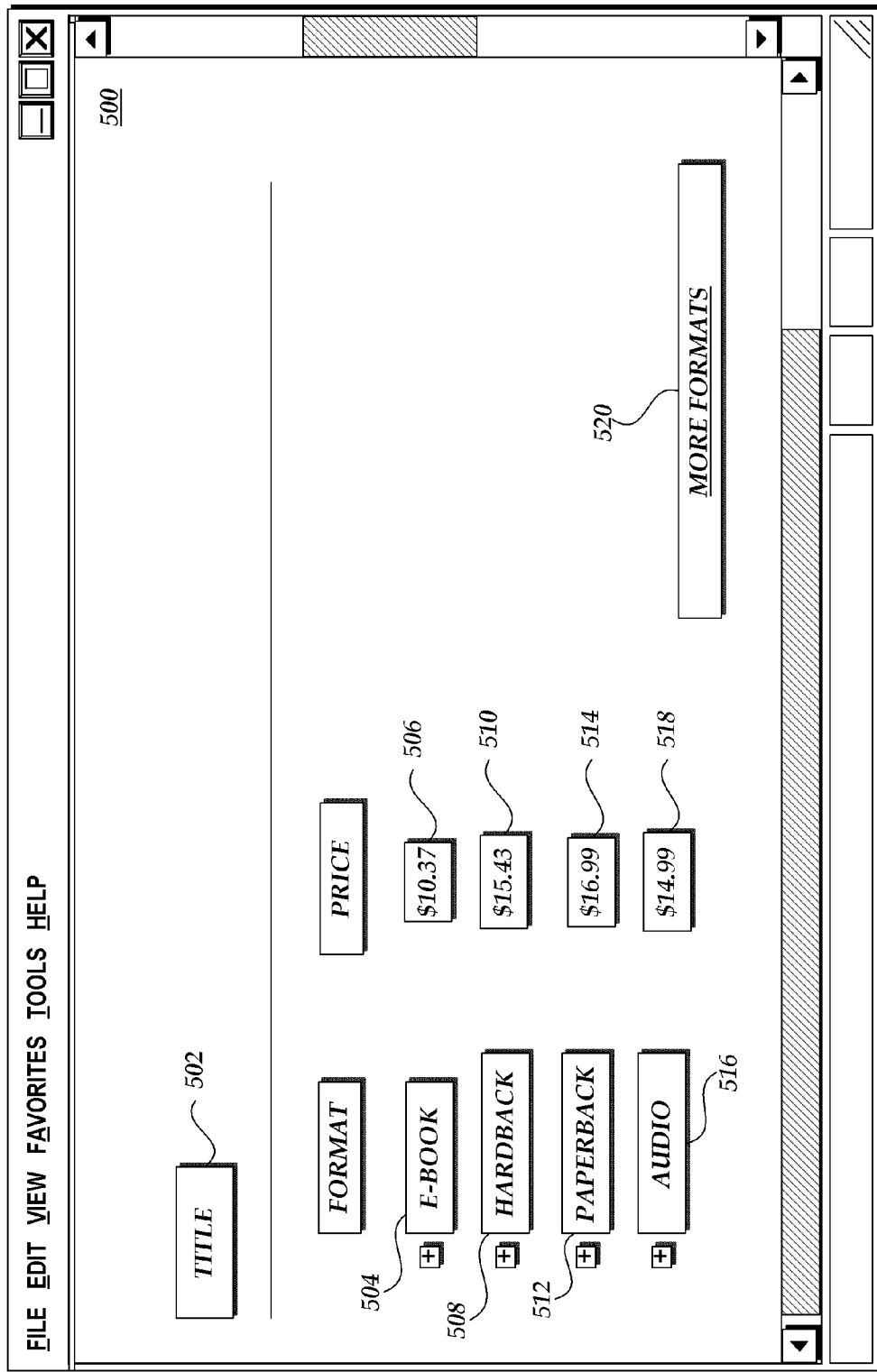
FIGS. 5A and 5B are block diagrams illustrative screen displays generated by client computing devices.

Turning now to FIG. 5A, a block diagram of screen display 500 generated by a client computing device 102 and illustrating the display of instance data based on a selection of an item will be described. For purposes of the description of FIG. 5A, it is assumed that the content provider system 106 has obtained a user selection of an item and processed instance type information to determine the prioritized (and possibly filtered) set of instance types responsive to the user selection. The screen display 500 includes a first object 502 representative of the item selected by the user, "Title of the Book."

The screen display 500 further includes a display of a prioritized order of instance types of the item. As illustrated in FIG. 5A, the prioritized order includes a first representation 504 of an instance type corresponding to an electronic book compatible media. The representation 504 also includes a reference 506 to a selling price. The prioritized order includes a second representation 508 corresponding to a hardback media. The representation 508 also includes a reference 510 to a selling price. The prioritized order includes a third representation 512 corresponding to a paperback media. Similarly, the representation 512 includes a reference 514 to a selling price. Finally, the prioritized order includes a fourth representation 516 corresponding to an audio media. The representation 516 includes a reference 518 to a selling price.

In one embodiment, the representation of selling price information 506, 510, 514, 518 may correspond to an average selling price for the tangible media or a lowest cost of the tangible media. In the event that additional instance types are available, but have not been displayed (or otherwise filtered), the screen display includes a representation 520 for viewing additional instance types. In another embodiment, the representation of selling prices information 506, 510, 514, 518 may correspond to a specific tangible media that is available for selection/purchase. The selection of the specific tangible media may be based on any one of the previously described prioritization criterion or multiple criteria. One skilled in the relevant art will appreciate that the specific implementation of a screen display providing instance type information may vary according the display capabilities of the client computing devices 102, a context in which the item was selected, layout configurations made by the content provider or user specified criteria.

Figure 5B:
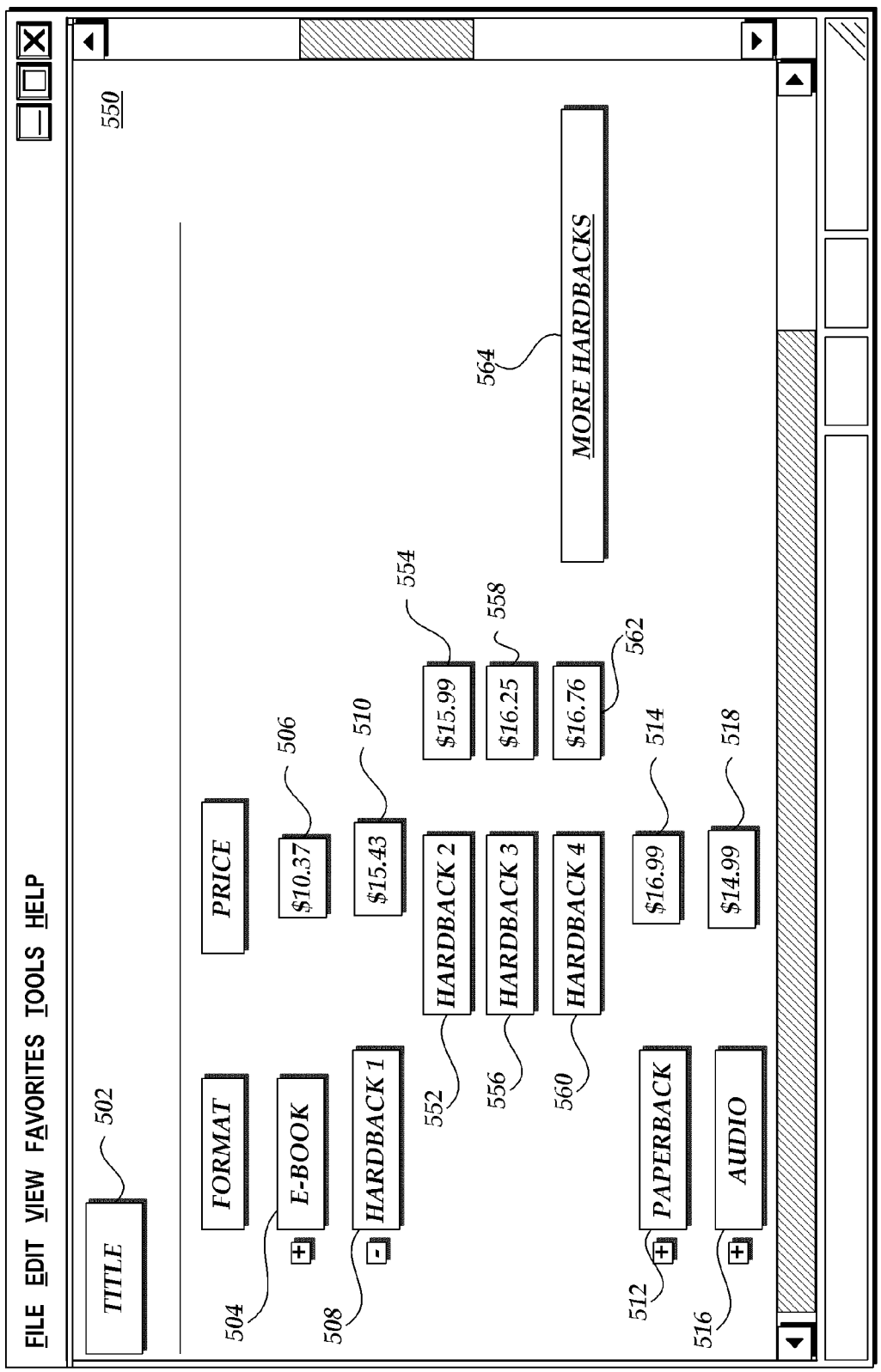

With reference now to FIG. 5B, a block diagram of a screen display 550 generated by a client computing device 102 and illustrating the display of attribute data based on a selection of an item will be described. For purposes of the description of FIG. 5B, it is assumed that the content provider system 106 has obtained a user selection of a representation of one of the displayed instance types in FIG. 5A, namely the second representation 508 (e.g., "hardback"). The content provider system 106 then has processed attribute information to determine the prioritized (and possibly filtered) set of attribute information responsive to the user selection.

The screen display 550 includes at least some of the same display objects as illustrated in screen display 500, including the selection of the specific hardback book, 510, previous. Additionally, the second representation 508 has been "expanded" to illustrate additional selectable attributes of the selected representation 508. Specifically, the screen display 550 includes a first representation 552 corresponding to an "illustrated" physical attribute of the hardback instance type. The representation 552 also includes a reference 554 to a selling price. The screen display 550 also includes a second representation 556 corresponding to a "large print" physical attribute of the hardback instance type. The representation 556 also includes a reference 558 to a selling price. Finally, the screen display 550 includes a third representation 560 corresponding to a "leather bound" hardback instance type. The third representation 560 also includes a reference 562 to a selling price. In the event that additional instance types are available, but have not been displayed (or otherwise filtered), the screen display includes a representation 564 for viewing additional attributes.

One skilled in the relevant art will appreciate that the specific implementation of a screen display providing instance type and attribute information may vary according the display capabilities of the client computing devices 102, a context in which the item was selected, layout configurations made by the content provider or user specified criteria.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. As such, reference in the disclosure to actions performed by a module or component relates to the execution of executable instructions by a processing device, or devices, to cause the referenced action to be performed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method of managing items by a content provider system comprising one or more computing devices with one or more processors configured with specific computer-executable instructions, the computer-implemented method comprising:
   obtaining a selection of an item from a user via a user interface displayed on a client computing device;
   in response to the selection of an item, dynamically identifying, by the content provider system, a plurality of instance types, wherein the plurality of instance types correspond to the item;
   determining by the content provider system, based on information of the user stored in a user information database, user history information or user geographic information;
   generating, by an item management processing component, a filtered list of instance types, wherein the filtered list of instance types is generated by filtering the plurality of instance types according to a criteria determined by the user history information or the user geographic information;
   determining, by the item management processing component, from the filtered list of instance types, at least a first instance type and a second instance type, wherein the first instance type corresponds to a first tangible medium of the item and the second instance type corresponds to a second tangible medium of the item, wherein the first instance type and the second instance type are mutually exclusive;
   identifying, by the content provider system, a first seller, wherein the first seller is associated with the first instance type of the item;
   identifying, by the content provider system, a second seller, wherein the second seller is associated with the second instance type of the item;
   determining, by the content provider system, a prioritized order for the first instance type and the second instance type, wherein the prioritized order for the first instance type and the second instance type is based at least in part on seller prioritization criteria pertaining to at least one of the first seller and the second seller, wherein the seller prioritization criteria is based at least in part on a classification of a relationship of the seller with the content provider system;
   causing display, by the content provider system, of a first selectable representation corresponding to the first seller and the first instance type of the item;
   causing display, by the content provider system, of a second selectable representation corresponding to the second seller and the second instance type of the item, wherein the first selectable representation and the second selectable representation are caused to be displayed according to the prioritized order for the first instance type and the second instance type;
   obtaining from the user via the user interface a selection of the first selectable representation of the first instance type or the second selectable representation of the second instance type, wherein the selection of the first selectable representation of the first instance type or the second selectable representation of the second instance type results in a selected instance type;

dynamically determining, by the content provider system, a prioritized order for selectable representations of the selected instance type based, at least in part, on an attribute prioritization criteria; and causing display, by the content provider system, of the selectable representations of the selected instance type in accordance with the attribute prioritization criteria.

2. The computer-implemented method as recited in claim 1 wherein determining the prioritized order for the first instance type and the second instance type, wherein the prioritized order for the first instance type and the second instance type is based at least in part on seller prioritization criteria pertaining to at least one of the first seller and the second seller includes determining the prioritized order for the first instance type and the second instance type additionally based on user information.

3. The computer-implemented method as recited in claim 2, wherein the user information corresponds to geographic information associated with a user.

4. The computer-implemented method as recited in claim 2, wherein the first and second instance types are associated with one or more attributes, the method further comprising determining a prioritized order for the one or more attributes associated with each of the first and second instance types.

5. The computer-implemented method as recited in claim 4 further comprising providing the prioritized order of the one or more attributes responsive to a selection of an instance type.

6. The computer-implemented method as recited in claim 4, wherein the one or more attributes correspond to physical attributes of the respective instance types.

7. The computer-implemented method as recited in claim 1, wherein at least two mutually exclusive instance types have a common attribute.

8. A content provider system for managing items, the system comprising:

an electronic data store configured to store information about one or more items, each item embodied in a plurality of mutually exclusive instance types; and a computing device with one or more processors in communication with the electronic data store, the computing device configured to:

receive a selection of an item from a user via a user interface displayed on a client computing device;

in response to the selection of an item, dynamically identify a plurality of instance types, wherein the plurality of instance types correspond to the item;

determine by the content provider system, based on information of the user stored in a user information database, user history information or user geographic information;

generate, by an item management processing component, a filtered list of instance types, wherein the filtered list of instance types is generated by filtering the plurality of instance types according to a criteria determined by the user history information or the user geographic information;

determine, from the filtered list of instance types, at least a first instance type and a second instance type, wherein the first instance type corresponds to a first tangible medium of the item and the second instance type corresponds to a second tangible medium of the item, wherein the first instance type and the second instance type are mutually exclusive;

identify at least a first seller and a second seller, wherein both the first seller and the second seller are associated with at least one of the first instance type and the second instance type;

determine a prioritized order for the first instance type and the second instance type based at least in part on seller prioritization criteria pertaining to at least one of the first seller and the second seller, wherein the seller prioritization criteria is based at least in part on a classification of a relationship of the seller with the content provider system; and cause display of one or more selectable representations, wherein the display of the one or more selectable representations correspond to the prioritized order for the first instance type and the second instance type;

obtain from the user via the user interface a selection of a selectable representation of the one or more selectable representations corresponding to the first instance type or the second instance type, wherein the selection of the selectable representation corresponding to the first instance type or the second instance type results in a selected instance type;

dynamically determine a prioritized order for selectable representations of the selected instance type based, at least in part, on an attribute prioritization criteria; and cause display of the selectable representations of the selected instance type in accordance with the attribute prioritization criteria.

9. The system for managing items as recited in claim 8, wherein the first instance type and the second instance type are selected from a group consisting of hardback publications, paperback publications, electronic reader representations, and audio representations.

10. The system for managing items as recited in claim 8, wherein one of the first instance type and the second instance type corresponds to an audio publication and wherein physical attributes corresponding to the audio publication corresponds to a recorded media.

11. The system for managing items as recited in claim 8, wherein the prioritized order for the first instance type and the second instance type relates additionally to at least one of a measurement of relative popularity of the first and second instance types, a release date of the first and second instance types, shipping information associated with the delivery of the first and second instance types, a classification of the first and second instance types, or a retail price associated with the first and second instance types.

12. The system for managing items as recited in claim 8, wherein the prioritized order for the first instance type and the second instance type is also based at least in part on geographic information associated with a user.

13. The system for managing items as recited in claim 12, wherein the computing device is further configured to filter at least one of the first and second instance types based on information indicative of a lack of support in a geographic region.

14. The system for managing items as recited in claim 12, wherein the computing device is further configured to filter at least one of the first or second instance types based on user profile information identifying instance types not previously purchased by a user.

15. A non-transitory computer-readable medium comprising a computer-executable component, the computer-executable component comprising:
 an item management component of a content provider system configured to:
  receive a selection of an item from a user via a user interface displayed on a client computing device;
  responsive to receiving a selection of an item, dynamically identify, by the content provider system, a plurality of instance types, wherein the plurality of instance types correspond to the item;
  determine by the content provider system, based on information of the user stored in a user information database, user history information or user geographic information;
  generate, by an item management processing component, a filtered list of instance types, wherein the filtered list of instance types is generated by filtering the plurality of instance types according to a criteria determined by the user history information or the user geographic information;
  determine, from the filtered list of instance types, at least a first instance type and a second instance type to which the item corresponds, wherein the first instance type corresponds to a first tangible medium of the item and the second instance type corresponds to a second tangible medium of the item, wherein the first instance type and the second instance type are mutually exclusive;
  identify a first seller, wherein the first seller is associated with the first instance type of the item;
  identify a second seller, wherein the second seller is associated with the second instance type of the item;
  determine a prioritized order for the first instance type and the second instance type based at least in part on seller prioritization criteria pertaining to at least one of the first seller and the second seller, wherein the seller prioritization criteria is based at least in part on a classification of a relationship of the seller with the content provider system; and
  cause display of one or more selectable representations, wherein the display of the one or more selectable representations correspond to the prioritized order of for the first instance type and the second instance type;
  obtain from the user via the user interface a selection of a selectable representation of the one or more selectable representations corresponding to the first instance type or the second instance type, wherein the selection of the selectable representation corresponding to the first instance type or the second instance type results in a selected instance type;
  dynamically determine a prioritized order for selectable representations of the selected instance type based, at least in part, on an attribute prioritization criteria; and
  cause display of the selectable representations of the selected instance type in accordance with the attribute prioritization criteria.

16. The non-transitory computer-readable medium as recited in claim 15, wherein the prioritization order relates additionally to at least one of an attribute of the first and second seller.

17. The non-transitory computer-readable medium as recited in claim 16, wherein an attribute of the first and second seller corresponds to affiliation information associated with an identified entity.

18. The non-transitory computer-readable medium as recited in claim 16, wherein an attribute of the first and second seller corresponds to location information associated with the first and second seller.

19. The non-transitory computer-readable medium as recited in claim 16, wherein an attribute of the first and second seller corresponds to review information associated with the first and second seller.

20. The non-transitory computer-readable medium as recited in claim 16, wherein the first and second seller are different sellers.

21. The non-transitory computer-readable medium as recited in claim 16, wherein the first and second seller are a same seller.

22. The non-transitory computer-readable medium as recited in claim 16, wherein an attribute of the first and second seller corresponds to service levels associated with the first and second seller.

* * * * *

UNITED STATES PATENT AND TRADEMARK OFFICE
CERTIFICATE OF CORRECTION

PATENT NO.         : 9,904,439 B2
APPLICATION NO.    : 13/801442
DATED              : February 27, 2018
INVENTOR(S)        : Daniel J. Callies et al.

Page 1 of 1

It is certified that error appears in the above-identified patent and that said Letters Patent is hereby corrected as shown below:

In the Specification

In Column 6 at Line 36, Change "item." to --item--.

In Column 7 at Line 55, After "In" delete "n".

In the Claims

In Column 14 at Line 1, In Claim 15, after "order" delete "of".

Signed and Sealed this
Seventh Day of May, 2019

Andrei Iancu
*Director of the United States Patent and Trademark Office*